US007110658B1

(12) United States Patent
Iggulden et al.

(10) Patent No.: US 7,110,658 B1
(45) Date of Patent: *Sep. 19, 2006

(54) METHOD AND APPARATUS FOR ELIMINATING TELEVISION COMMERCIAL MESSAGES

(75) Inventors: Jerry Iggulden, Santa Clarita, CA (US); Kyle Fields, Sacramento, CA (US); Alan McFarland, North Hollywood, CA (US)

(73) Assignee: TeleVentions, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,468

(22) Filed: Aug. 27, 1999

Related U.S. Application Data

(63) Continuation of application No. 08/573,433, filed on Dec. 15, 1995, now Pat. No. 5,987,210, which is a continuation-in-part of application No. 08/304,781, filed on Sep. 12, 1994, now Pat. No. 5,696,866, which is a continuation-in-part of application No. 08/177,813, filed on Jan. 4, 1994, now Pat. No. 5,692,093, which is a continuation-in-part of application No. 08/103,067, filed on Aug. 6, 1993, now Pat. No. 5,455,630, and a continuation-in-part of application No. 08/002,782, filed on Jan. 8, 1993, now Pat. No. 5,333,091.

(51) Int. Cl.
*H04N 5/91* (2006.01)
(52) U.S. Cl. .............................. 386/46; 386/69; 386/80; 386/81
(58) Field of Classification Search ................. 386/46, 386/69, 6–8, 68, 70, 78–82, 125–126, 52–65, 386/4; 358/908; 348/907; 360/72.1, 72.2, 360/13; H04N 5/76, 5/783, 9/79
See application file for complete search history.

(56) References Cited

U.S. PATENT DOCUMENTS

| 2,424,216 | A | 7/1947 | Atkins |
| 2,630,525 | A | 3/1953 | Tomberlin et al. |
| 2,761,897 | A | 9/1956 | Jones |
| 3,011,030 | A | 11/1961 | Langendorf |
| 3,424,865 | A | 1/1969 | Marchand |
| 3,628,153 | A | 12/1971 | Fukata |
| 3,681,523 | A | 8/1972 | Sidline |
| 3,725,604 | A | 4/1973 | Alexander |
| 3,730,986 | A | 5/1973 | Morchand |
| 3,745,240 | A | 7/1973 | Morchand et al. |
| 4,167,028 | A | 9/1979 | Tobey |
| 4,229,765 | A | 10/1980 | Sanger |
| 4,259,689 | A | 3/1981 | Bonner et al. |

(Continued)

FOREIGN PATENT DOCUMENTS

DE  31 35 806  9/1981

(Continued)

*Primary Examiner*—Thai Tran
*Assistant Examiner*—Heather R. Jones
(74) *Attorney, Agent, or Firm*—Blakely, Sokoloff, Taylor & Zafman

(57) ABSTRACT

A video recording and playback device (10) incorporates a processor (114) for processing the video signal to detect the presence of commercial messages. Video and audio event detectors (102, 104) detect the presence of events in the signal as it is recorded. The timing relationship of the detected events is analyzed to classify the video segments between events as program material or as commercial messages. After a program is recorded, control marks are generated (132) to indicate the beginning and end of commercial groups so that they will be skipped during subsequent replay of the recorded program.

2 Claims, 15 Drawing Sheets

U.S. PATENT DOCUMENTS

| | | |
|---|---|---|
| 4,314,285 A | 2/1982 | Bonner et al. |
| 4,319,286 A | 3/1982 | Hanpachern |
| 4,325,088 A | 4/1982 | Wright |
| 4,343,024 A | 8/1982 | Kawai |
| 4,390,904 A | 6/1983 | Johnston et al. |
| 4,430,676 A | 2/1984 | Johnson |
| 4,492,993 A | 1/1985 | Otis |
| 4,520,404 A | 5/1985 | Von Kohorn |
| 4,570,192 A | 2/1986 | Hori |
| 4,587,572 A | 5/1986 | DiGiulio |
| 4,602,297 A | 7/1986 | Reese |
| 4,605,973 A | 8/1986 | Von Kohorn |
| 4,618,895 A | 10/1986 | Wright |
| 4,703,311 A | 10/1987 | Roggendorf |
| 4,707,749 A | 11/1987 | Nishijima et al. |
| 4,750,052 A | 6/1988 | Poppy et al. |
| 4,750,053 A | 6/1988 | Allen |
| 4,750,213 A | 6/1988 | Novak |
| 4,752,834 A | 6/1988 | Koombes |
| 4,774,600 A | 9/1988 | Baumeister |
| 4,777,537 A | 10/1988 | Ueno et al. |
| 4,782,401 A | 11/1988 | Faerber et al. |
| 4,855,827 A | 8/1989 | Best |
| 4,879,611 A | 11/1989 | Fukui et al. |
| 4,882,783 A | 11/1989 | Roggendorf |
| 4,979,047 A | 12/1990 | Wine |
| 5,018,027 A | 5/1991 | Roggendorf |
| 5,019,899 A | 5/1991 | Boles et al. |
| 5,057,932 A | 10/1991 | Lang |
| 5,063,456 A | 11/1991 | Horiuchi et al. |
| 5,075,546 A | 12/1991 | Kamada et al. |
| 5,151,788 A | 9/1992 | Blum |
| 5,333,091 A * | 7/1994 | Iggulden ............. 358/908 |
| 5,488,409 A | 1/1996 | Yuen et al. |
| 5,621,536 A | 4/1997 | Kizu |
| 5,692,093 A * | 11/1997 | Iggulden et al. ............ 386/46 |
| 5,696,866 A * | 12/1997 | Iggulden et al. ............ 386/46 |
| 5,987,210 A * | 11/1999 | Iggulden et al. ............ 386/46 |
| 5,999,688 A * | 12/1999 | Iggulden et al. ........... 358/908 |
| 5,999,689 A * | 12/1999 | Iggulden ................ 386/46 |
| 6,002,443 A * | 12/1999 | Iggulden ............... 348/907 |
| 6,404,977 B1 * | 6/2002 | Iggulden ............... 386/46 |

FOREIGN PATENT DOCUMENTS

| | | |
|---|---|---|
| DE | 32 17 557 | 5/1982 |
| EP | 0 158 293 | 4/1985 |
| EP | 0 161 152 | 4/1985 |
| EP | 0 378 393 | 1/1990 |
| EP | 0 505 683 | 1/1992 |
| EP | 0 526 739 | 7/1992 |
| GB | 2 246 233 | 7/1990 |
| JP | 57-27481 | 2/1982 |
| JP | 57-88542 | 2/1982 |
| JP | 58-146072 | 8/1983 |
| JP | 1-174192 | 12/1987 |
| JP | 2-58693 | 2/1990 |
| JP | 3-292655 | 4/1990 |
| JP | 4-255949 | 2/1991 |
| JP | 4-283447 | 3/1991 |
| JP | 4-322581 | 4/1991 |
| JP | 3-280234 | 12/1991 |
| WO | WO 81/00945 | 2/1981 |

* cited by examiner

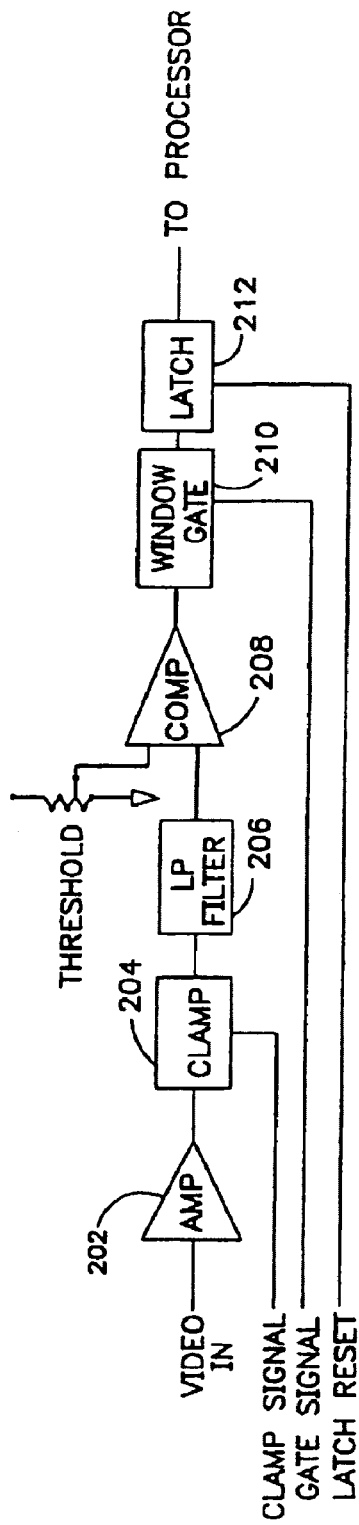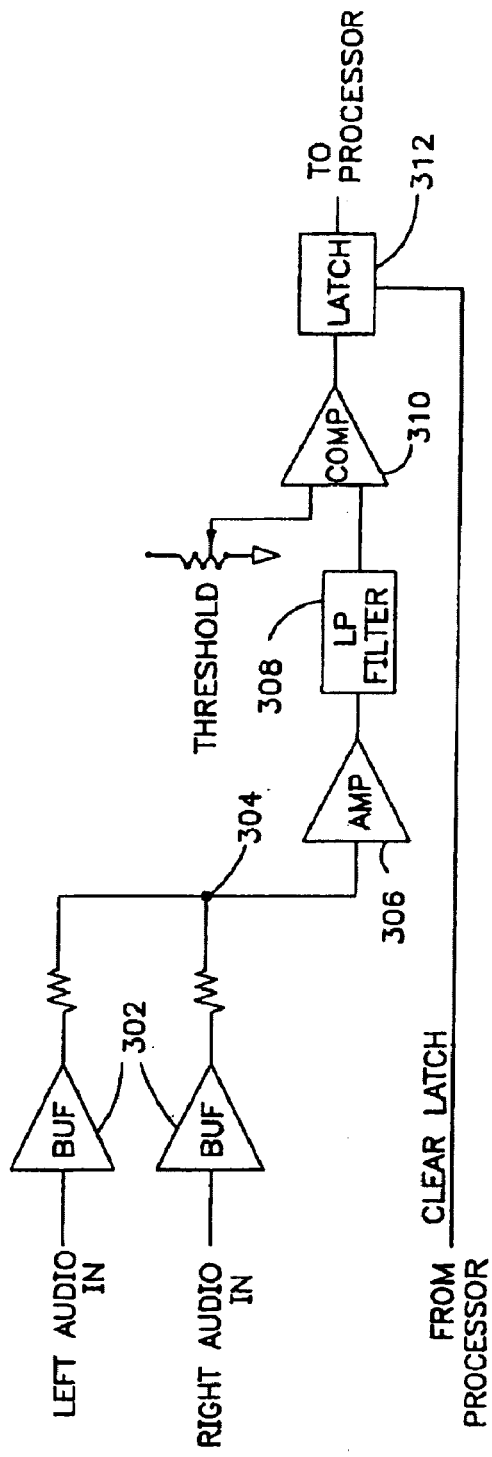

METHOD AND APPARATUS FOR ELIMINATING TELEVISION COMMERCIAL MESSAGES

RELATED APPLICATIONS

This is a continuation of application Ser. No. 08/573,433, filed on Dec. 15, 1995, now U.S. Pat. No. 5,987,210, which is a continuation-in-part of application Ser. No. 08/304,781 files Sep. 12, 1994, now U.S. Pat. No. 5,696,866, which is a continuation-in-part of application Ser. No. 08/177,813 filed Jan. 4, 1994, now U.S. Pat. No. 5,692,093, which is a continuation-in-part of application Ser. No. 08/002,782 filed Jan. 8, 1993, now U.S. Pat. No. 5,333,091, and of application Ser. No. 08/103/067 filed Aug. 6, 1993 now U.S. Pat. No. 5,455,630.

BACKGROUND OF THE INVENTION

1. Field of the Invention

This invention relates to the field of video recording and playback systems, and particularly to a method and apparatus for selectively omitting certain program content during playback of a recorded video signal.

2. Background Art

It is commonplace to record a commercially broadcast television program on a video tape recorder (VTR, also referred to as a video cassette recorder or VCR) for viewing at a later time. When later viewing the recorded program, many, if not most, viewers prefer to watch only the program material without also viewing commercials, promotional messages and the like that are typically broadcast at intervals during the program.

Even before the advent of popularly priced video tape recorders, there have been many attempts to provide home television viewers with a system to suppress commercial messages. Early efforts included systems that would mute the audio signal for a predetermined period of time when a commercial message was sensed. As VCRs became more popular and "time-shifting" became a convenient way to view television programs, more sophisticated methods for eliminating commercial messages have been proposed.

One prior art approach to commercial elimination has been to pause the VCR in the record mode when a commercial message is sensed. A system of this type is disclosed in U.S. Pat. No. 4,319,286, which issued on Mar. 9, 1982 to Hanpachern. In this system, the absence of video modulation during a video frame (i.e., a blank frame) is detected and used to trigger a timing circuit. When triggered, the timing circuit causes a pause command to be sent to a video tape recorder. The pause command remains asserted for a predetermined period of time, or longer if the timing circuit is retriggered. For example, the timing circuit may be set for 32 seconds so that if blank frames are detected at 30 second intervals (a typical length for a commercial message) the VCR will remain in the pause mode until 32 seconds after the last such blank frame. Quite a few prior art references disclose variations on this type of system, wherein the VCR is paused for a fixed period of time following detection of a blank frame in the video signal. For example, PCT Application No. WO81/00945 by Johnston and Koombes discloses a system of this type. Such systems are claimed to be relatively effective for eliminating commercial messages, but suffer certain drawbacks. In this regard, program material immediately following a commercial break is irretrievably lost since the VCR is held in the "pause" mode for a predetermined period of time (30 to 60 seconds or more) following each break in the television signal. Furthermore, additional program material may be irretrievably lost if the timing circuit is falsely triggered, such as by a fade between scenes in the program.

Other prior art systems have sought to overcome these drawbacks. For example, U.S. Pat. No. 5,151,788 to Blum discloses a system for eliminating commercials from a video signal that performs real time analysis of the video signal immediately following a blank frame. If there is a high level of "activity" in the signal immediately following a blank frame, a commercial message is presumed and the VCR is commanded to pause. On the other hand, if a low level of activity is detected, the preceding blank frame is presumed to be a fade and the VCR is commanded to resume recording. This approach solves the problem of losing a fixed amount of program material if a VCR pause if falsely triggered, but it is still susceptible to misclassification. If a program fade is immediately followed by an "active" scene, this will be misclassified as a commercial. On the other hand, a commercial with a low level of "activity" will be misclassified as program material.

A different approach to eliminating commercial messages is to automatically rewind a VCR to the beginning of a commercial message each time one is detected while recording a television program. One such system is disclosed in U.S. Pat. No. 4,750,052, which issued on Jun. 7, 1988 to Poppy and Samelson. A virtually identical system is disclosed in U.S. Pat. No. 4,752,834, which issued on Jun. 21, 1988 to Koombes. In both of these systems, fades (i.e., blank frames) in the video signal are detected and the time interval between successive fades is determined in a timing circuit. If the timing criteria for a commercial message are met, the VCR is rewound to the position of the fade associated with the beginning of the commercial message and the VCR is returned to the record mode. This process repeats for each commercial message that is detected. These systems permit an editing decision to be made after an entire commercial has been aired; however, as with the other systems previously described, program material is still irretrievably lost if there is a false detection of a commercial. Furthermore, the frequent rewinding of the tape during long commercial breaks accelerates the wear of the VCR tape transport mechanism as well as the tape itself.

Yet a different approach is disclosed by Mizuki in Japanese patent document 58-146072, which was published on Aug. 31, 1983. A similar system is disclosed in U.S. Pat. No. 4,570,192, which issued on Feb. 11, 1986 to Hori. In both of these systems, a video program is viewed by an operator as the program is recorded or is replayed. The operator places an electronic mark on the tape at the beginning and end of each commercial message or any other undesired recorded material. When the tape is subsequently replayed, either for viewing or transcription to another tape, the VCR is commanded to fast-forward through the portions of tape bounded by the applied marks. These systems rely entirely on human intelligence to classify the different portions of the video signal.

Still other systems are known that discriminate commercial messages based on characteristics of the transmitted video signal. A system of this type has been marketed in Japan by Mitsubishi under the name "Auto-Cut". In this system, the audio channel is monitored for the presence of a second audio program (SAP) and/or stereo modulation. Many of the programs that viewers wish to tape are broadcast in dual languages (e.g., Japanese and English) and/or with monaural sound. However, commercial messages in Japan are generally broadcast in stereo and in the Japanese language only. Thus, a VCR with the Auto-Cut system is able to record a monaural program or one with SAP and suspend recording during commercials. Other systems marketed in Japan operate on a similar principle, but record the entire program and then place the VCR in a fast scan mode during playback when stereo sound or the absence of SAP is detected.

All known prior art automatic commercial elimination systems rely on real-time signal analysis to classify the broadcast signal as program material or as a commercial message. This is true whether the classification is being performed during the recording or playback process. Prior art automatic systems do not examine detected events in the full context of surrounding events. Thus, misclassification is relatively common. When done during the recording process, such misclassification will cause portions of program material to be irretrievably lost.

SUMMARY OF THE INVENTION

The present invention provides a method and apparatus for controlling the operation of a video recording and playback device so as to automatically eliminate commercial messages during playback of a recorded television signal.

The apparatus of the present invention comprises a video recorder/player having at least a record mode, a play mode and a fast scan mode; a recording medium for insertion into the video recorder/player so as to record a video signal thereon in the record mode and play the video signal recorded thereon in the play mode; event detection means for detecting events within the video signal (such as black frames in combination with silent frames); means for marking the recording medium with a first type of mark in proximity to a respective event recorded on the recording medium; a data memory for storing the times of occurrence of events detected in the record mode; means for analyzing the events to classify segments of the video signal as being of a first category (e.g., program material) or of a second category (e.g., commercial messages); means for positioning the recording medium to beginning and ending positions of each segment classified as being of the second category; means for marking the recording medium with a second type of mark in a predetermined relationship to a corresponding first mark at the beginning positions and with a third type of mark in predetermined relationship to a corresponding first mark at the ending positions.

The present invention also provides a video recording method comprising the steps of recording a video signal on a recording medium; monitoring the video signal as it is recorded to detect events therein; marking the recording medium with a first type of mark in proximity to a respective event recorded on the recording medium; storing data representative of a time of occurrence of each event; analyzing the data to classify segments of the video signal between events as being of a first or second category; positioning the recording medium to beginning and ending positions of each segment of the video signal classified as being of the second category; marking the recording medium with a second type of mark in predetermined relationship to a corresponding first mark at each of the beginning positions; and marking the recording medium with a third type of mark in predetermined relationship to a corresponding first mark at each of the ending positions.

BRIEF DESCRIPTION OF THE DRAWINGS

FIG. 2 is a functional schematic of the video event detector circuitry.

FIG. 3 is a functional schematic of the audio event detector circuitry.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

U.S. Pat. No. 5,333,091 discloses a control unit that is coupled between a conventional VCR and a conventional television receiver/monitor. This "stand alone" control unit processes the video signal prior to being recorded to detect events within the signal and to modulate the recorded signal with a time code. The spacing and duration of the detected events is analyzed to classify the video signal between events as either program material or commercial message material. A map of the video signal is stored in the control unit. Upon playback of the recorded program, the map is retrieved and control signals are sent to the VCR to rapidly scan through the commercial messages as the program is replayed.

Figure 1:
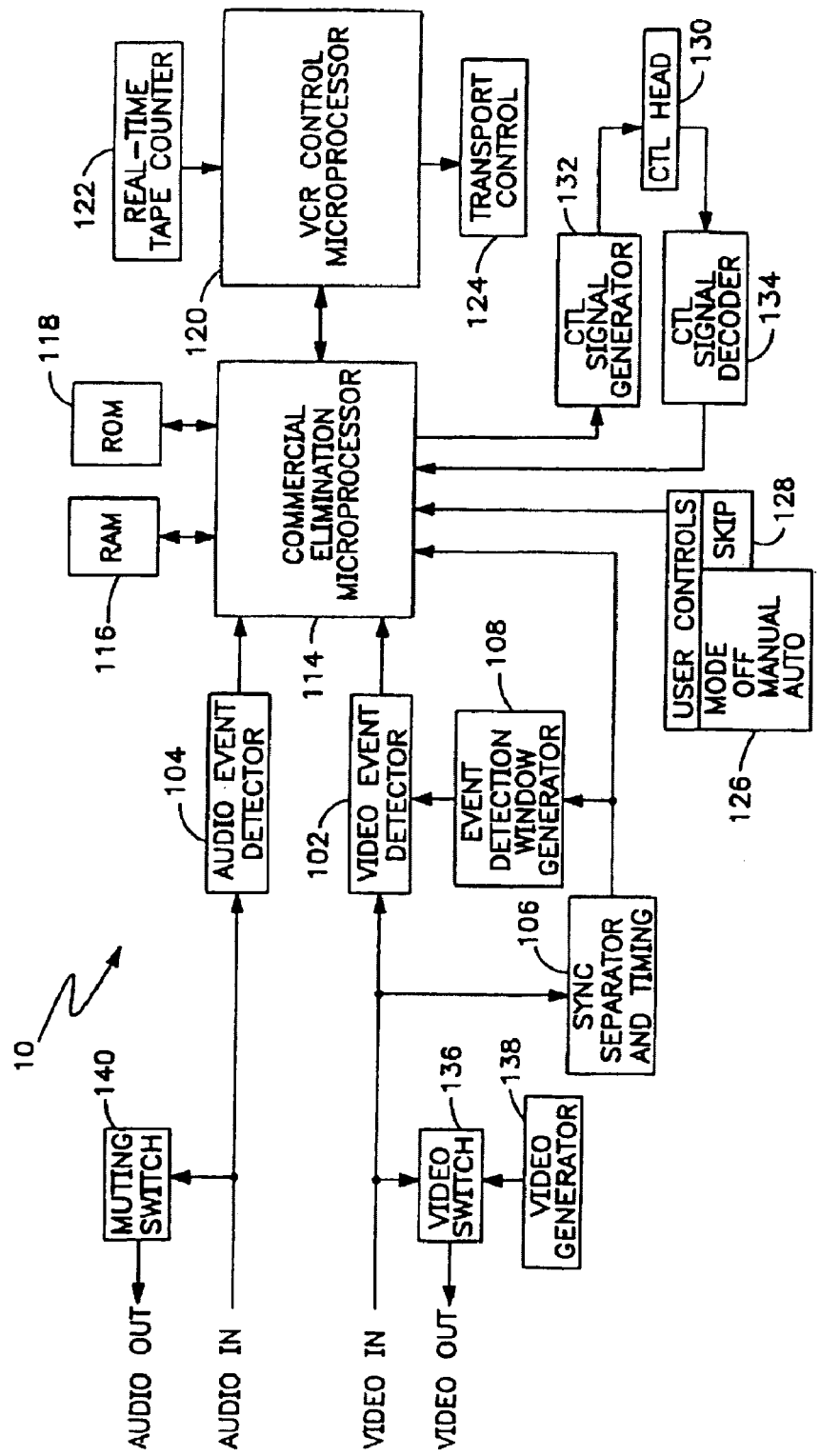
FIG. 1 is a functional block diagram of a commercial elimination system according to the present invention.

The subject of this disclosure is a system functionally similar to that disclosed in U.S. Pat. No. 5,333,091, but which is preferably incorporated within a video recording device such as a VCR. Although a VCR is the preferred recording mechanism, the invention is not limited in this regard and may be practiced with other video recording media such as magnetic discs or writable optical discs. FIG. 1 is a partial block diagram of a video recording device 10 according to the present invention. For clarity, only those functions related to commercial elimination are shown. Of course, it will be recognized that certain functions may be housed in a unit that is physically separate from the VCR, if desired. For example, the event detection circuitry comprising functional blocks 102, 104, 106 and 108 and the commercial elimination microprocessor 114 with its associated memories 116, 118 could all be housed in a unit that is attached to the VCR by an interface cable or umbilical, or that is attached directly to a plug-in socket on the VCR. Such a configuration could be utilized to adapt a basic VCR chassis for use in different markets where differing broadcast protocols require specialized commercial detection processing.

Referring still to FIG. 1, the "VIDEO IN" and "AUDIO IN" signals originate from the VCR tuner in a recording mode of operation or from the VCR playback heads in a playback mode of operation. These signals are applied at video and audio event detectors 102 and 104, respectively, which are more fully described below. The outputs of event detectors 102 and 104 are interrogated by commercial elimination microprocessor 114 to build an event list that will be processed by a commercial detection algorithm.

All commercial detection and elimination functions are controlled by microprocessor 114. Associated with microprocessor 114 is random access memory (RAM) 116 for scratch pad storage and read only memory (ROM) 118, which stores the operating instructions for processor 114. In a typical embodiment, processor 114, RAM 116 and ROM 118 should have the following characteristics:

| Processor type | 8 bits |
|---|---|
| ROM space | 8K bytes |
| RAM space | 700 bytes |
| Instruction execution time | 1 to 2 µsec |
| A/D converter inputs | 2 (multiplexed) |
| A/D conversion time | 50 µsec or less |
| External interrupts | 1 |
| Communications port | I²C or equivalent |

If event detection is implemented external to the processor, such as in analog circuitry, processor 114 need not have analog-to-digital (A/D) conversion capability.

Microprocessor 114 communicates extensively with VCR control microprocessor 120. With respect to commercial elimination functions, VCR control microprocessor 120 monitors the real time tape counter 122 and controls the operation of tape transport 124. In some embodiments, it may be advantageous to combine the functions of processors 114 and 120 into a single processor.

Nearly all of the functions of commercial elimination microprocessor 114 are automatically controlled. However, two user controls are provided. A MODE switch 126 allows the user to select a fully automatic commercial elimination mode, a manual mode or to disable all commercial elimination functions. A SKIP button 128 provides user control of the commercial skipping function when operating in the manual mode. Controls 126 and 128 may be placed on the front panel of device 10; however, they are preferably included on a remote control transmitter that provides user controls for all of the conventional VCR functions. Alternatively, the choice of operating mode may be effected through an on-screen menu rather than a dedicated control 126.

The commercial detection algorithm executed by microprocessor 114 identifies the location of commercial groups on a video tape. To implement the commercial elimination feature, the video tape is marked at the beginning and end of each commercial group. These markings are preferably written onto the control track of the video tape with control head 130. During the marking operation, the commercial identification markings are provided by control signal generator 132. When the video tape is replayed, the commercial identification markings are read by control signal decoder 134. Although marking of the control track is preferred, the present invention may also be practiced by applying the tape markings elsewhere, such as in the vertical blanking interval of the video signal, in which case the read/write functions can utilize the video play and record heads of the VCR.

As mentioned above, the "VIDEO IN" and "AUDIO IN" signals originate from the VCR playback heads in the playback mode of operation. During commercial skipping, it is desirable to mute both of these signals. For this purpose, the video signal is routed through video switch 136, which also receives the output of video generator 138. The latter circuit provides a constant video signal, such as a solid blue screen. Other types of video screens may be developed by video generator 138. An operator control may be provided to over-ride video switch 136 if it is desired to view the video signal as commercials are scanned past. Muting switch 140 mutes the audio output signal during fast scan, although this is a feature that is already implemented in most VCRs.

Video Event Detection

In one embodiment of the invention that is described in detail herein, video event detector 102 detects "black" frames in the video signal. A "black" frame is one in which there is essentially no video signal at all, such as is characteristic of frames immediately preceding and following commercial messages in television broadcasts of the major U.S. networks.

One embodiment of detector 102 is shown in greater detail in FIG. 2.

Detector 102 monitors the incoming video signal and provides a signal to the commercial elimination processor 114 whenever the video falls within black detect limits. Black frame detection includes the following elements:

Signal clamping, for automatic level control

Filtering to reduce effects of video noise

Comparison to a threshold level

An active area detection window

Latched detection output

The detection of black video level is accomplished by comparing the video level to a precise threshold level in comparator 208. To be effective, this threshold is very near the black video level. Accurate control of the video signal is required to allow for correct detection with changing video signal levels. The input video signal is first amplified by amplifier 202 and then the video level is normalized through the use of a DC clamp circuit 204. This circuit is activated in the back porch area of each horizontal video line. A control pulse signal is generated in sync separator/timing circuit 106 that occurs from the trailing edge of the horizontal sync to the end of the video back porch. This signal drives clamping circuit 204 that sets a DC level in the video signal prior to detection.

There are many types of noise commonly present in video signals. The black detector preferably includes a low-pass filter 206 to provide filtering of fast, spurious luminance signals, characteristic of video "snow". This type of noise is very common and originates from poor video reception and other interference. By providing a high frequency bypass to ground, the effects of such noise are greatly reduced.

Once the video signal has been properly conditioned and filtered, it is compared against the fixed DC threshold level in comparator 208. The threshold is preferably set at about 25 IRE. Any video luminance excursion that exceeds this threshold will change the output state of the comparator. This function requires a relatively high speed signal comparator capable of responding to signal changes in the microsecond range.

Detector 102 is sensitive to video level excursions that exceed the preset threshold level. To prevent false detection, the event detection window generator 108 provides a detection window that gates the detector within a rectangular portion of the viewable screen at window gate 210. Timing for generation of the detection window is provided from sync separator and timing circuit 106, which detects the horizontal and vertical synchronization pulses within the video signal and provides logic level timing signals for the video processing circuitry. Sync separator 106 may be constructed with discrete components using well known video circuits or may utilize a commercially available integrated circuit such as a Motorola MC 44145 device or equivalent.

The rectangular detection window excludes the start and end of the video frame, thereby eliminating video occurring during vertical blanking. The window also excludes the left and right edges of the picture to eliminate false detection due to video effects occurring in the horizontal sync areas of the picture. Some television scrambling systems will produce a video signal at the extreme edges of the picture, and this will be disregarded.

The output of the detection comparator 208 can be a fast pulse, necessitating that it be latched for sampling by the commercial elimination processor. A simple latch device 212 is provided that will capture any detection event occurring during the video frame. Once the state of the latch has been sampled by the commercial elimination processor it is cleared for the next video frame.

Audio Event Detection

Pauses in television audio are also important indicators for commercial detection, especially when they occur simultaneously with the occurrence of video events such as black frames. The silent frame detector 104, shown in greater detail in FIG. 3, monitors the incoming audio signal and provides an output when periods of silence are detected in the audio. The audio detection circuitry contains the following elements:

Summing of left and right audio channels (if stereo audio)
Amplification of signal prior to detection
Filtering
Comparison to a threshold level
Latching of detection output The input audio signals from both stereo channels are buffered by circuits 302. For best response, both left and right audio signals are summed together prior to detection. This is easily accomplished using a summing node 304 and simple amplifier 306. The audio level is amplified so that detection of very low level audio is enhanced. An amplification factor of approximately 2 to 4 will provide adequate signal to the audio comparator 310. This amplification also provides AC coupling of the signal to present an audio level that can be easily referenced to ground. Filter 308 removes static and other high frequency noise.

The audio detection is accomplished by comparing the audio level to a fixed threshold level which is set so that any noticeable audio level will exceed this threshold and change the output level of the comparator 310. The output of the level comparator 310 is held by latch 312 so that any fast audio excursion is captured for subsequent sampling by the commercial elimination processor. This sampling is typically accomplished every video frame, at the same time the black detector is sampled.

Digital Event Detection

While event detection with analog circuitry as described above provides satisfactory performance, a digital event detection approach is preferred since a variety of detection schemes can be implemented through software.

Although it is conventional for television broadcasts within the United States to have black frames preceding and following commercial messages, such is not necessarily the case. Broadcasters could insert virtually any video signal during program breaks. For example, a blue screen could be used (as is the case in France). A constant video signal of this sort, which need not be black, is referred to herein as "flat", i.e., the video signal is essentially constant throughout the frame. To detect "flat frame" events, the video event detection may be implemented to declare an event if the video signal within a field or frame varies from an average value by a predetermined amount. Since black frames are a subset of flat frames, such a flat frame detector is equally capable of detecting black frames.

Frames immediately preceding and following commercial messages may not even be flat. For example, a broadcaster could insert a patterned screen or a solid screen superimposed with the broadcaster's logo. To handle these situations, video event detection may employ a scene change (or cut) detector which compares the video signal within a plurality of screen windows from frame to frame. When the average video signal within any one or more of the windows changes by a predetermined amount, a scene change is declared. If there are two scene changes within a predetermined period of time (e.g., a change from program to a broadcaster logo screen followed by a change to a commercial message) an event is declared. The time interval for declaring an event of this type should be relatively short (on the order of five seconds or less) to minimize the number of false events detected. In some markets, such as Japan, the transition from program to commercial is an instantaneous cut. Detecting commercials in this environment also requires the ability to detect scene changes.

Figure 4:
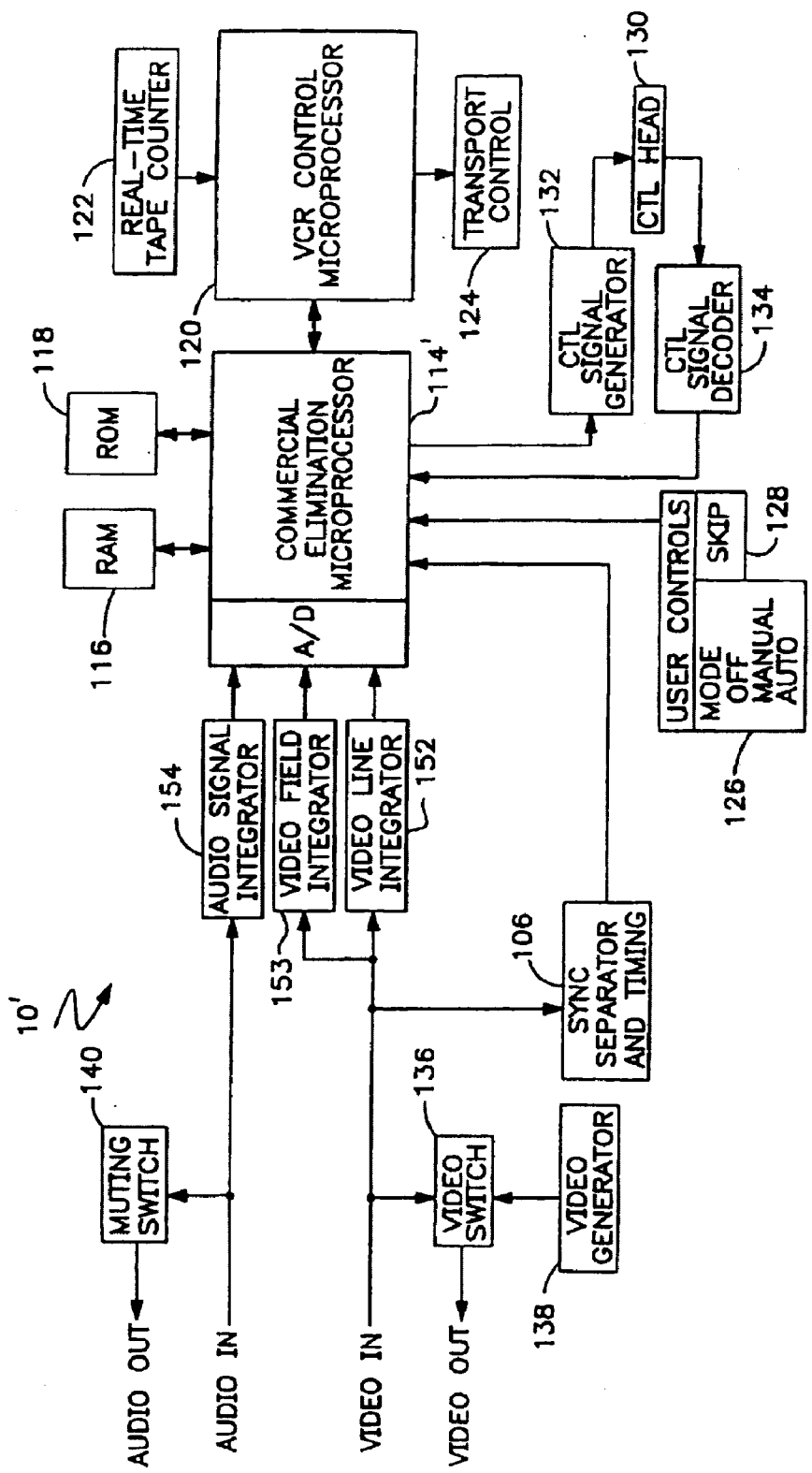
FIG. 4 is a functional block diagram of an alternative embodiment of a commercial elimination system according to the present invention.

With reference to FIG. 4, an alternative embodiment designated generally as device 10' is shown, in which any of the above-described event detection strategies can be selectively implemented. In this embodiment, the actual event detection is performed by software in microprocessor 114' based on digitized samples of the video signal from video line integrator 152. Processor 114' preferably includes a multiplexed analog-to-digital (A/D) converter as previously indicated. One such processor suitable for this application is the ST9296 from SGS, which has four analog inputs multiplexed to an 8-bit A/D converter. Alternatively, A/D conversion could be performed in a separate device that provides digital inputs to the microprocessor.

Figure 5:
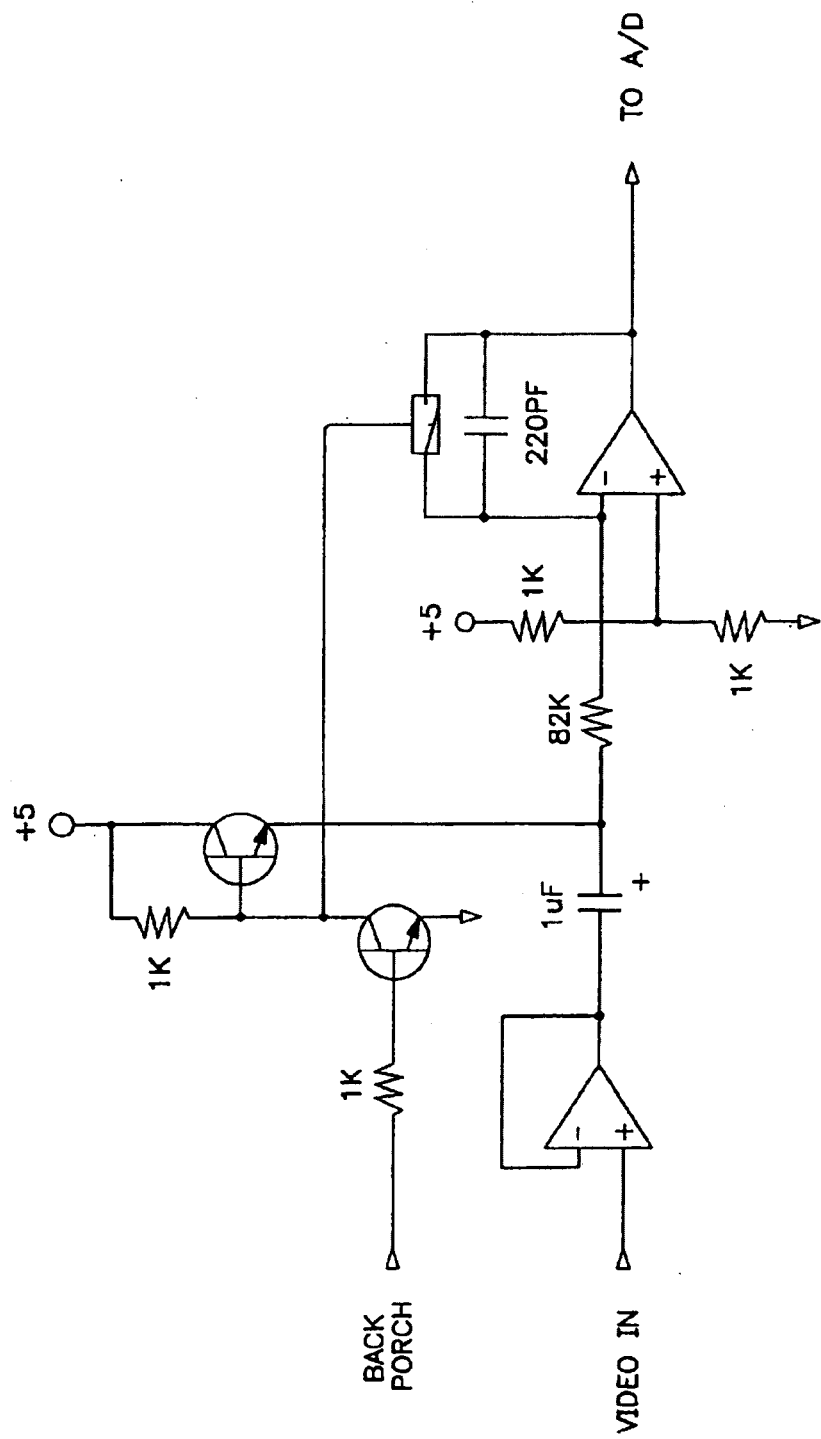
FIG. 5 is a schematic diagram of the video line integrator of FIG. 4.

FIG. 5 illustrates the analog circuitry of video line integrator 152 for processing the video signal prior to digital sampling. The VIDEO IN signal is preferably integrated across each complete video line between successive back porch regions of the horizontal blanking interval, although less frequent integration may be used as subsequently described. The output voltage of the integrator is asserted at one of the multiplexed A/D inputs of processor 114' where it is captured for conversion to an 8-bit binary value.

Processor 114' stores each of the binary values which represents the integrated luminance level of the respective video line. It should be noted that it may not be necessary to sample and store the luminance level of every video line. For example, sampling approximately 60 out of the 240 active lines in a video field may be sufficient to characterize the field.

With representative samples of the luminance levels of individual video lines, processor 114' detects the presence of video events. For flat field detection, samples within an entire video field are examined. The maximum and minimum luminance values are located and the difference is computed. This difference is then compared to a predetermined threshold. The field is declared to be "flat" if the difference is below the threshold.

As already mentioned, black fields (or black frames) are a subset of flat fields. To detect a purely black frame, the absolute luminance level of a flat field detected with video line integrator 152 may be tested to determine if it is below a predetermined threshold level. However, black frame detection may be enhanced by use of a positive slope analog integrator 153 that amplifies the video signal and integrates only positive slopes. Integrator 153 operates in parallel with video line integrator 152 and is sampled and reset every video field. The digitized sample is then compared in software to a fixed threshold to determine if the field is black. This approach allows for accurate detection of black fields without falsely detecting low luminance scenes within a regular television program.

Figure 16:
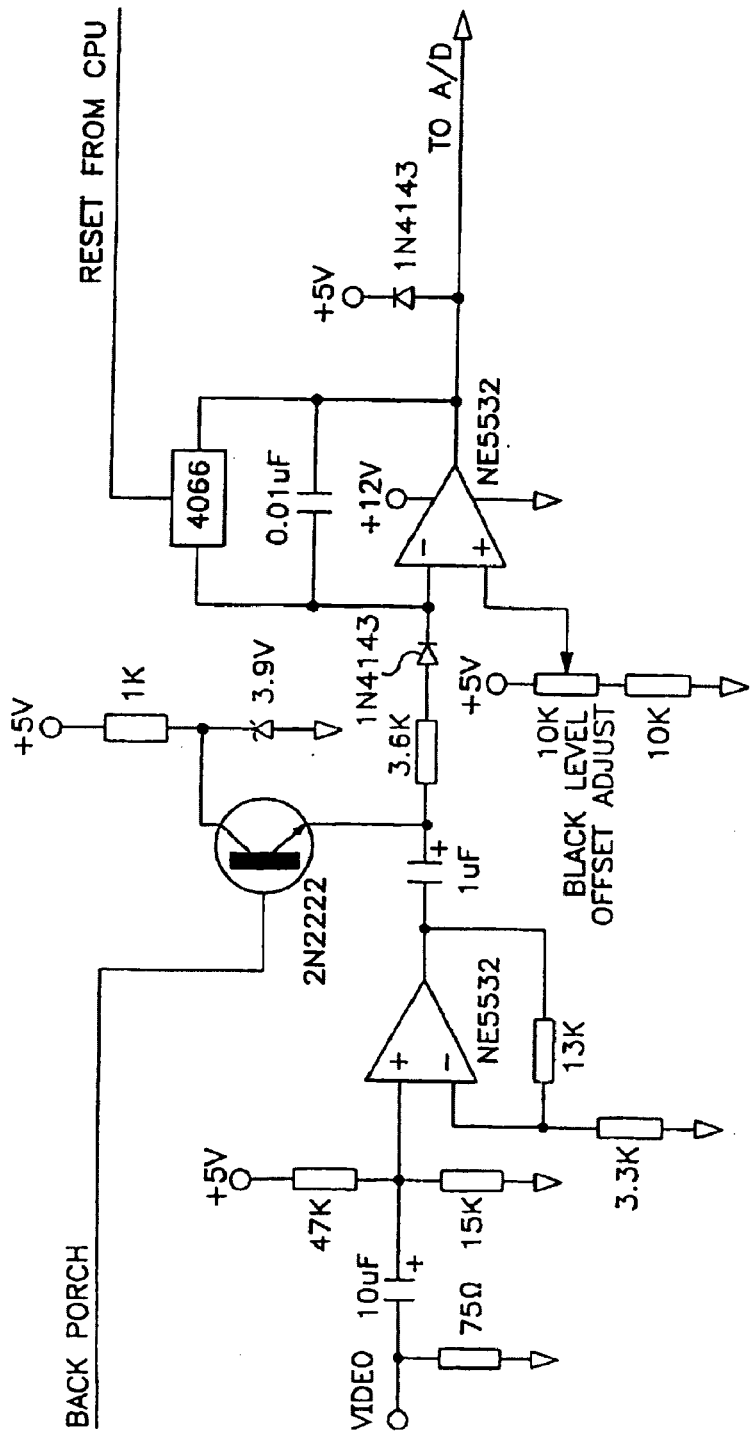
FIG. 16 is a schematic diagram of the video field integrator of FIG. 4.

A schematic diagram of a circuit suitable for use as video field integrator 153 is presented in FIG. 16. It should be observed that the output signal is inverted, i.e., the reset level is +5V and the signal integrates down to ground. However, it is convenient to consider the circuit a positive integrator with reference to a "pure black" video signal (7.5 IRE). The black level offset adjustment should be set so that a field of pure black video generates a negligible integration voltage at the end of the field (i.e., a +5V output).

Scene change or "cut" detection is also made possible with device 10'. Luminance levels of a video frame are compared to corresponding luminance levels of the following video frame. If a sufficient number of lines exhibit a change in luminance exceeding a predetermined threshold, then a scene change is declared. While it is possible to compare each video line for which a luminance value is determined with the corresponding line of the next frame, efficiency is increased if comparisons are made between corresponding horizontal bands of multiple lines. For example, the screen may be divided into 15 horizontal bands and the luminance levels of lines within each band averaged. The average luminance of each band is then compared to the corresponding value of the following frame.

Figure 6:
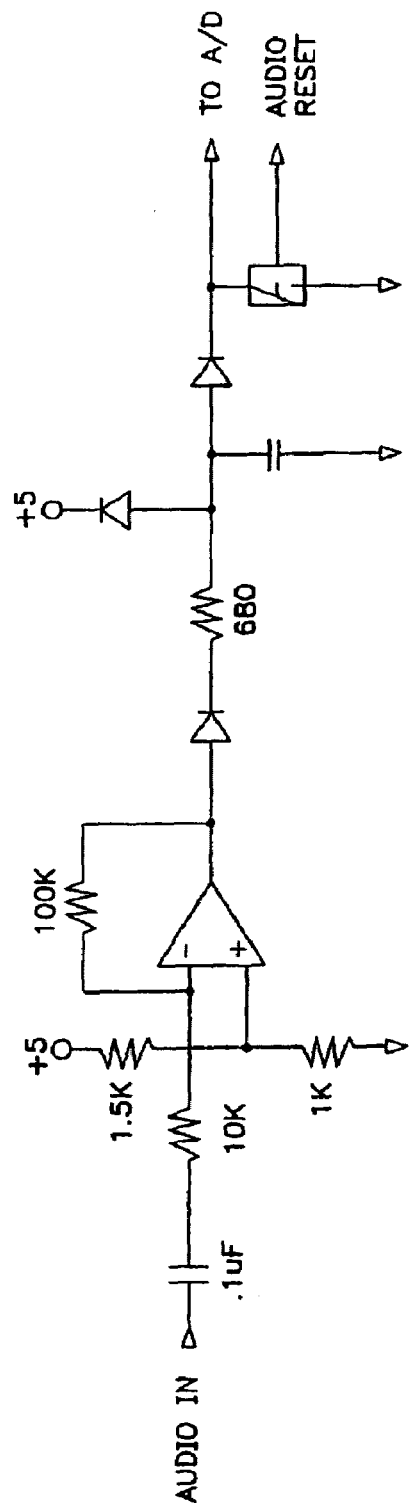
FIG. 6 is a schematic diagram of the audio signal integrator of FIG. 4.

Referring now also to FIG. 6, an audio signal integrator 154 is illustrated. In the case of a stereo VCR, the AUDIO IN signal in FIG. 6 is the sum of the left and right channels for the previously described embodiment. The integrated audio signal voltage is asserted at one of the multiplexed A/D inputs of processor 114'. The integrator is reset on command from processor 114'. It should be noted that the audio signal may be sampled at a much slower rate than the video signal, perhaps only once per video frame, in which case silent frame detection involves a simple threshold comparison.

In order to ensure accurate commercial detection, "events" are preferably declared on the basis of information obtained from both the video and audio detectors. For example, in the North American market, an event is declared only if there is coincidence of a black frame and a silent frame. Testing has shown, however, that the audio and video events are not always in phase with each other. If there is only a single black frame between commercials, audio silence may not occur in the exact same frame. To accommodate this, the event detection software should allow audio and video events to be skewed from each other by up to several frames.

Coincidence of video and audio events is also problematic when detecting cuts. The event detection software should look for audio silence that is simultaneous with the video cut, that precedes the video cut, and/or that follows the video cut. An alternative approach could implement an audio cut detector, somewhat similar to the video cut detector, that looks for discontinuities in the audio levels between successive video frames.

It will be observed that there is no functional unit in device 10' corresponding to the event detection window generator 108 of device 10. As should be apparent, the window function can be readily performed by software in processor 114' which receives the video sync signals as interrupts. This gives greater flexibility in sizing the detection window. This is particularly helpful for dealing with superimposed identification logos that are now included in many broadcasts. These logos, which can be transparent or solid, monochrome or color, are most frequently inserted in a corner of the picture. Broadcast sources may leave a logo inserted all of the time, may remove the logo during paid commercial time, or may insert the logo only periodically. To ensure accurate event detection in the presence of logos, the video lines where logos may be present are simply ignored. In NTSC format, there are 21 non-picture lines in the vertical blanking interval, or about 1.3 milliseconds. Ignoring 4 milliseconds of video from the vertical blanking interval causes sampling to begin on about line 63. In PAL or SECAM formats, about 5.2 milliseconds should be ignored from the vertical blanking interval. An equal amount of time should be ignored at the end of the field, before the vertical blanking interval.

Another approach for excluding graphic logos is to sample alternate video fields with different active window areas. For example, the first field of each frame could sample only the top two-thirds of the field, thereby excluding all lines in the bottom one-third of the field. The second field of the frame could then sample the lines in the bottom two-thirds of the field. If either field is determined to be flat or black, this can be declared an event.

Operational Description

The operating modes of devices 10 and 10' are basically similar to a conventional VCR. Recording and playback of video is accomplished in the same manner as on any other VCR. However, when the commercial elimination feature is enabled, device 10/10' performs additional functions during the various VCR operating modes. Most of these additional functions do not require interaction with the user.

By use of the MODE switch, the user may select between two basic operating modes—manual and automatic. This selection affects the handling of the video tape during the playback phase of device 10/10' as described below. All of the other operating phases of device 10/10' are identical in both manual and automatic modes.

The commercial elimination functions of device 10/10' can best be understood in terms of the various operating phases, each of which is described below.

Recording Phase

Figure 7:
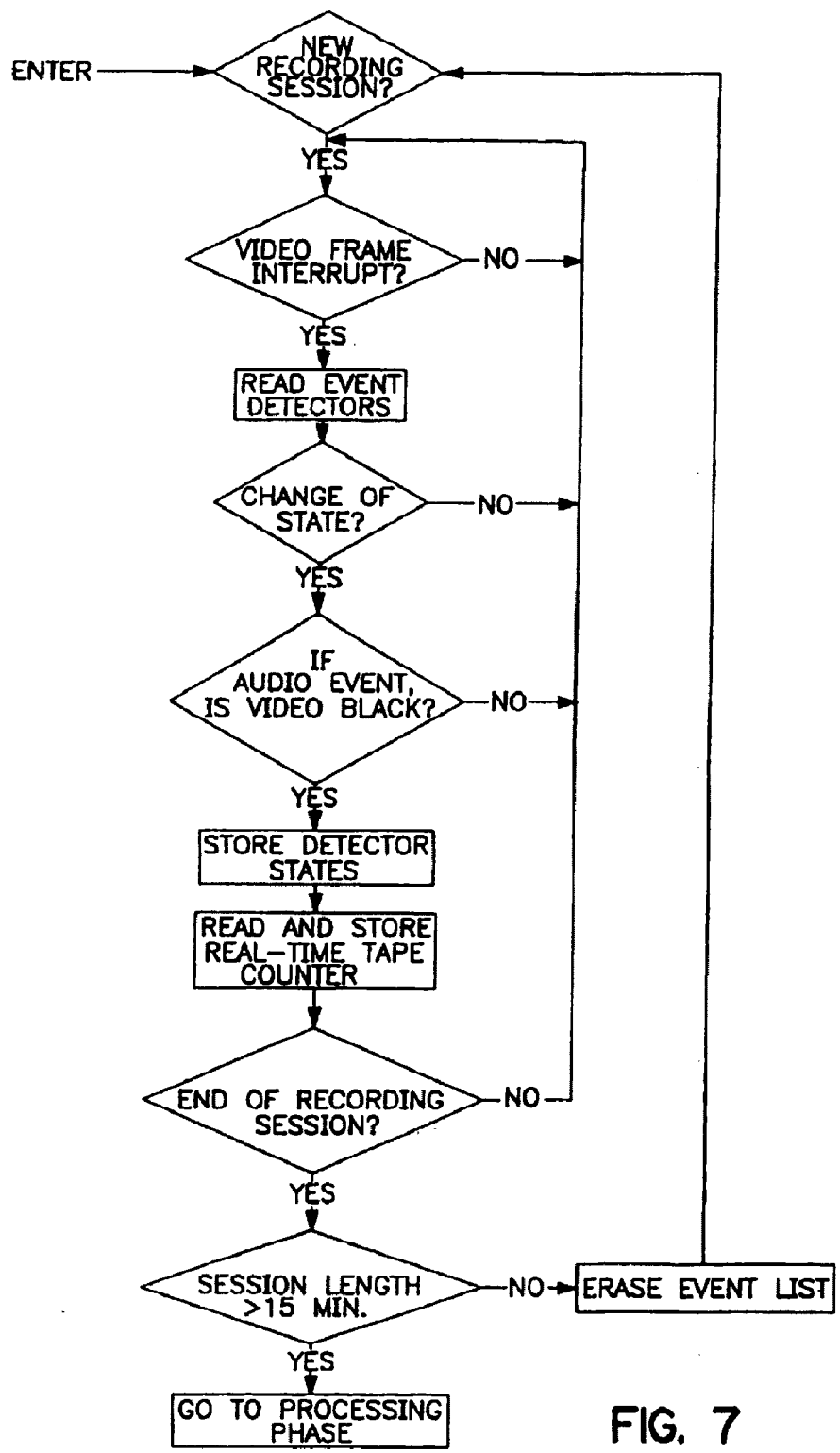
FIG. 7 is a functional flow diagram of the recording phase.

FIG. 7 shows the operations that are performed in the recording phase. This phase is active whenever the VCR is in record mode (either from key entry, or from timer operation), and the commercial elimination feature is enabled. From the user's perspective, video programs are recorded as on any standard VCR. However, as indicated in FIG. 7, the device is transparently performing other functions while recording is in progress.

During the recording phase, the event detectors are sampled and the tape location of each event, obtained from the real-time tape counter, is stored in an event list in temporary memory. For purposes of commercial detection processing, an "event" is determined in accordance with the particular broadcast protocol of the program being recorded. As previously discussed, black video frames are events of interest in many TV markets, particularly North America. In other markets, such as Japan, video cuts are events of interest. In this description, North American broadcasting conventions are presumed. However, it will be recognized that device 10/10' is operable in other markets with suitable modifications.

As events are detected, the video tape is marked in real time with a "sync" mark at the location of each detected event. The sync mark, the format of which is more fully described below, starts at the beginning of the event and has a duration of four video fields. The purpose of the sync marks is to precisely indicate the possible start and end points of a commercial group. Since the sync marks are written onto the tape prior to the event analysis which classifies the program segments between events as program or commercial, the sync marks by themselves do not indicate the presence of a commercial group. During the subsequent processing and marking phases, the positions of the commercial groups will be determined and indicated by writing different marks on the tape.

The sync marks facilitate precise switching between the normal play and fast scan modes which provides the best viewing experience in the playback phase. However, the use of sync marks is not essential to the operation of device 10/10'. Without sync marks, the marks identifying the beginning and ending of a commercial group may be written on the tape with reference to the real-time tape counter.

The recording phase is normally terminated whenever the VCR stops recording (whether by manual action, end of tape, timer or other function). After recording, the commercial elimination processor enters the processing phase (described below). If the recording session is less than a predetermined minimum length, say 15 minutes, the stored events may be erased, and the processing phase may be bypassed. At any time during the recording phase the user can disable the commercial elimination feature by setting the MODE switch to OFF. This has the effect of canceling all data stored for the current session and prevents operation of the commercial elimination processing phase.

Application of the sync marks to the control track is ordinarily done at the time a video program is recorded. However, it may be desired to mark a tape that has been previously recorded on a different VCR which lacks the commercial elimination functions of the present invention. In such case, a modified recording phase is implemented in which the previously recorded video tape is "played" while event detection and sync marking proceeds in the manner described above. Subsequent processing and marking is then accomplished in the same manner as for a newly recorded tape so that the tape may thereafter be played with commercial elimination enabled.

Processing Phase

This phase is active for a short time following the recording phase. Its purpose is to analyze the event list and determine when commercial groups occurred. This process involves applying a commercial elimination algorithm (described below) that analyzes the event list and identifies the occurrence of television commercial groups. The algorithm produces a commercial group list that includes the start and stop point of each commercial group identified within the recording session. This list of commercial groups is used during the tape marking phase to indicate the commercial groups on the video tape. Since the location of individual events is no longer needed, the event data in memory may be erased or overwritten after completion of the processing phase.

Figure 8:
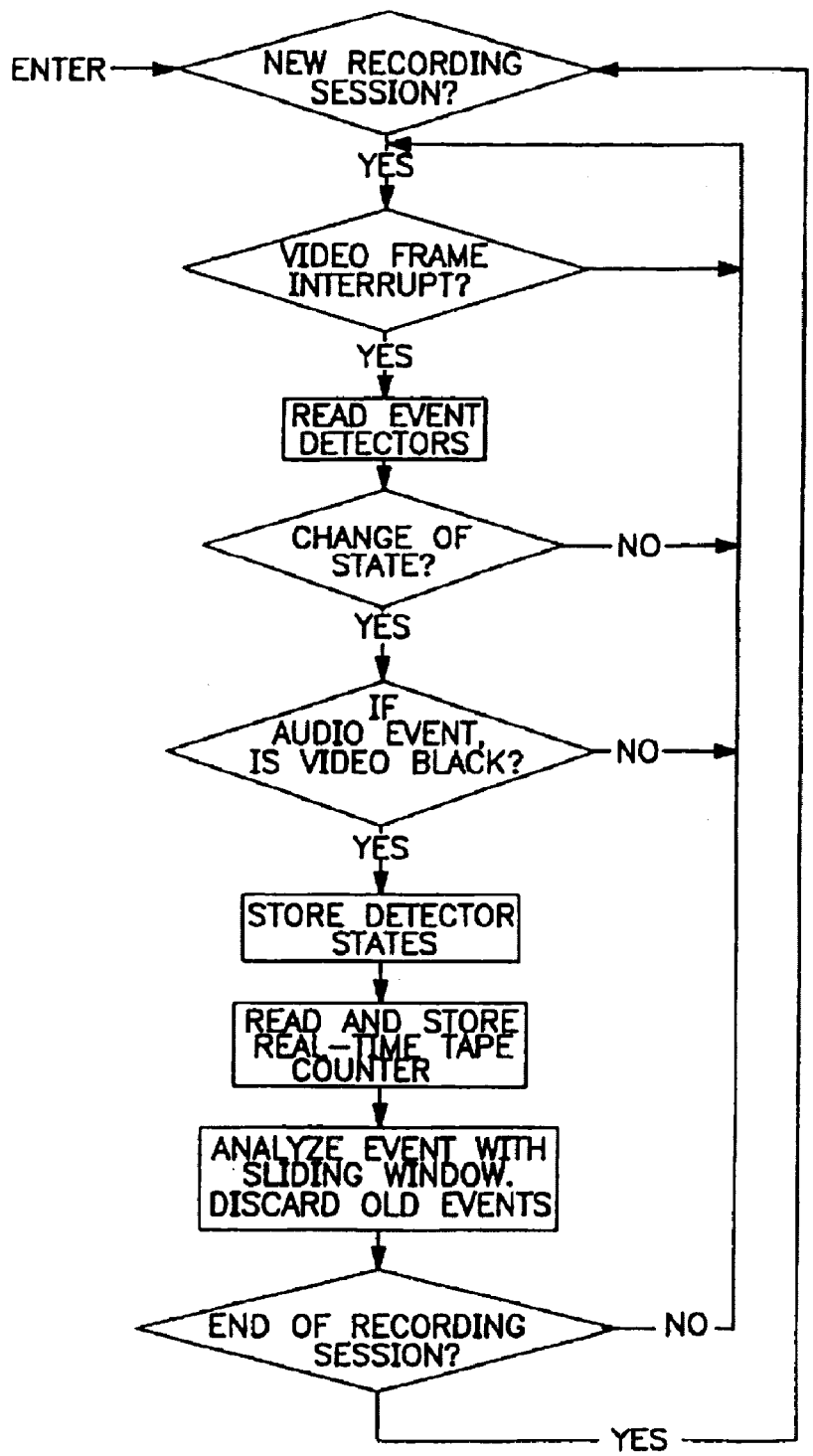
FIG. 8 is a functional flow diagram of the recording phase in an alternative embodiment of the invention.

FIG. 8 illustrates an alternative embodiment, one that is particularly useful if the size of RAM 116 is limited. In this embodiment, the processing phase is integrated with the recording phase so that processing is performed "on-the-fly". The event list is processed continuously with a sliding window having a width of approximately two minutes or as necessary to accommodate the decision rules discussed below. The event list can thus be organized as a first-in-first-out file requiring only a modest amount of RAM since relatively few events occur within a two minute period. Such "on-the-fly" processing is particularly advantageous when cut detection is utilized to identify events. In this case, there is a relatively large number of events which would require a sizable memory to store the event list for an entire recording session.

Tape Marking Phase

Figure 9:
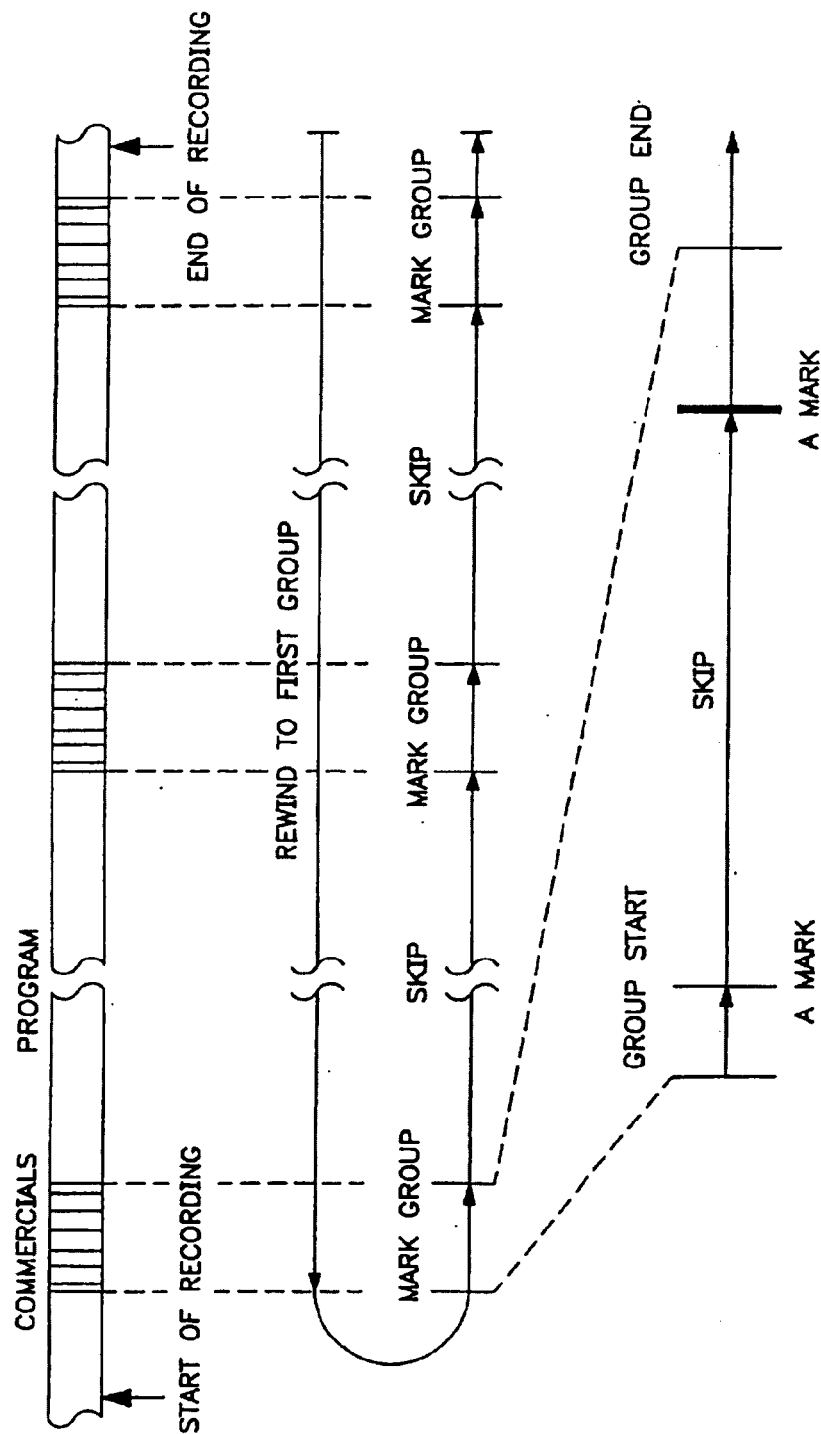
FIG. 9 illustrates the operations performed in the tape marking phase.

FIG. 9 diagrammatically illustrates the tape marking phase operations. After the processing phase is complete, the commercial group list in memory indicates the start and end points of the commercial groups that were identified within the recording session. In the marking phase, the VCR is rewound to the approximate beginning of the first commercial group. The tape is then marked by writing signals on the control track to identify the start and end of each commercial group. Each start and end mark is associated with a corresponding sync mark as more fully explained below. The real-time tape counter is used throughout the marking phase to indicate the current tape position to the commercial elimination processor. This is compared to the values stored in the commercial group list to control the tape transport and marking operations. Since the sync marks are written on the control track during the recording phase, their position is always accurate with respect to the recorded video signal. In performing the marking operation, the VCR can use the position of the sync marks to correct the real-time tape counter for any accumulated error. After the entire recording session has been marked (which may take a few minutes), the tape is left positioned at the end of the recording. The VCR returns to standby mode of either Stop or Off (if in Program Timer mode). Upon successful completion of the tape marking phase, the commercial group list in memory may be deleted.

During the marking phase, the VCR operation can be stopped by the user selecting OFF with the MODE switch, or by pressing STOP on the VCR. This will have the effect of canceling all commercial elimination operational phases, and returns the VCR to Stop mode at its current position. Subsequent selection of MANUAL or AUTO with the MODE switch will not restart commercial elimination operations until the next recording or playback session.

Each commercial group is marked with unique marks at the start (called the "A" mark) and end (called the "B" mark) of the group. This allows device 10/10' to differentiate the marks, and determine if the tape is entering or leaving a commercial group. The location of each B mark is advanced ahead of the actual event, to allow time for the VCR to brake and enter the normal Play mode when quickly skipping through a commercial group.

Whether or not commercials are detected in a recording session, a B mark is written approximately 54 seconds before the end of the session. This B mark is written so that any program material of a subsequent adjacent recording session will not be missed if the manual skip feature is used. This end of recording B mark is omitted only if the recording session was less than 15 minutes in length or if commercial elimination has been disabled.

In performing the marking operation, it is important to consider the effect of transport mode changes. Depending on the configuration of the tape transport, errors may occur in the real-time counter when the transport is changed between play, stop, rewind and fast forward modes. Such errors are most likely to occur when changing from an "on-head" mode to an "off-head" mode or vice versa. If the magnitude of these errors is significant, marking should be accomplished using only "on-head" transport modes (e.g., forward and reverse scan) to reduce the cumulative effect of real-time counter errors.

Playback Phase

Figure 10:
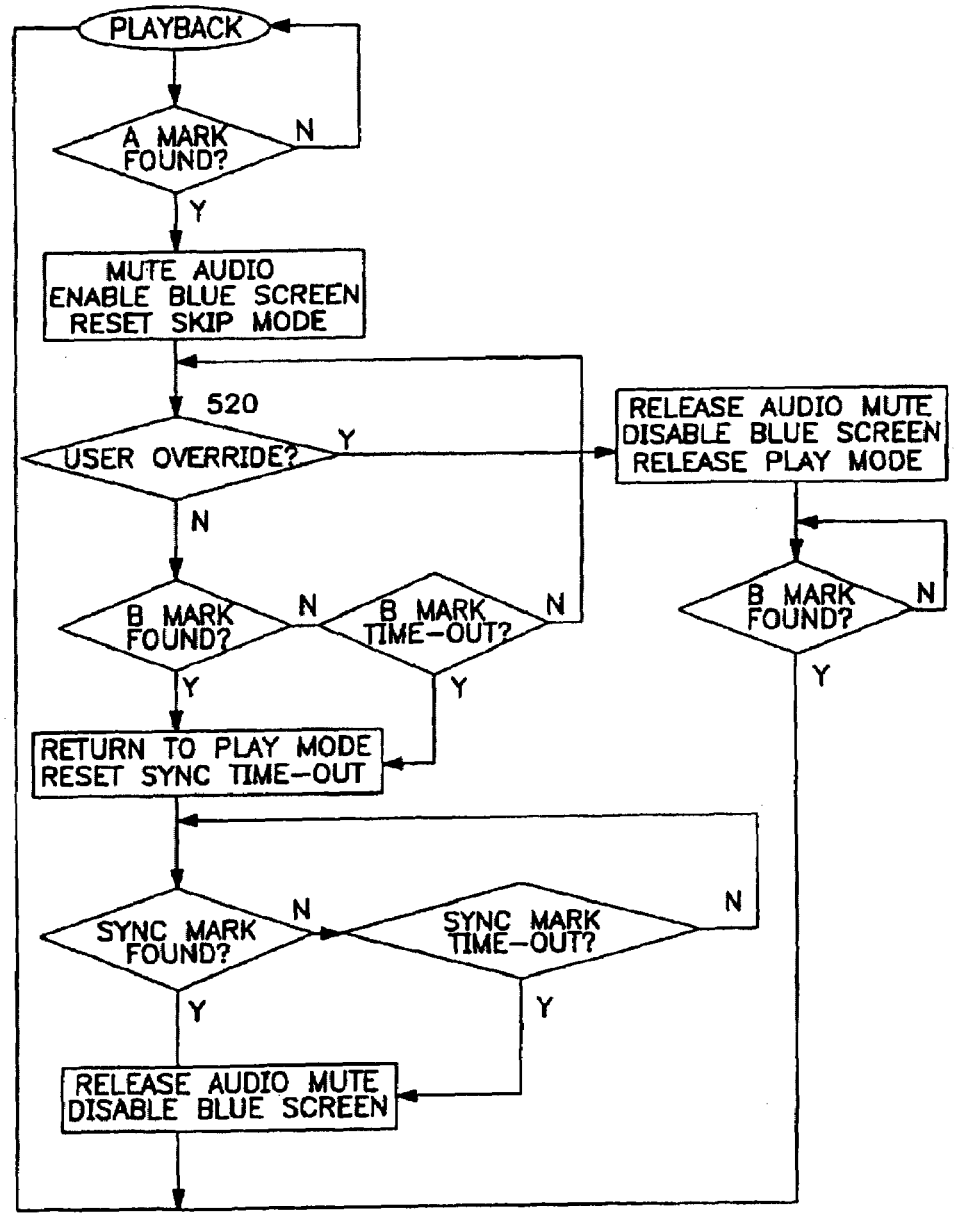
FIG. 10 is a functional flow diagram of the playback and over-ride phases.

FIG. 10 illustrates the operations performed during the playback phase. When the VCR is placed into Play mode, and the commercial elimination feature is enabled, the commercial elimination processor samples signals from the tape control track, looking for the marks that indicate the start and end of each commercial group. In the automatic operating mode, the VCR performs the following actions upon detection of an "A" mark at the start of each commercial group:

the VCR outputs a blue screen (unless blue screen feature is disabled);

the audio outputs are muted; and the tape is advanced at fast forward or forward scan speed.

When the VCR is skipping and a "B" mark is detected at the end of a commercial group, the VCR performs the following actions:

the tape is returned to normal Play mode;

the video signal is monitored for the sync mark at the end of the commercial group;

when the sync mark is detected (or after a 2-second time-out if the sync mark is not detected), the blue screen video is disabled and the audio outputs are enabled.

In manual operating mode, no automatic action is taken at the start of a commercial group. During playback in the manual mode of operation, device 10/10' functions like a conventional VCR, except that the user has the option to view or skip commercials. The recorded video signal, including commercials, is played back at normal speed. However, at any time the user can press the SKIP button, which causes device 10/10' to immediately generate a blue video screen, mute the audio, and forward scan to the start of the next program segment, thereby skipping over the current or next commercial group. Note that the VCR will start skipping to the end of the next commercial group as soon as the SKIP button is pressed (regardless of whether the VCR is currently in a commercial or television program segment). The skipping process will automatically stop at the end of the next commercial group.

In order to improve the effectiveness of commercial elimination, it may be desirable to bypass automatic fast scanning of certain commercial groups. In particular, commercial groups at the beginning and ending of a recorded program often contain promotional messages, teasers, program lead-ins/lead-outs and other material that many viewers wish to see. Such materials are often interspersed with commercials and may be classified as such by the commercial detection algorithm. Accordingly, it may be desirable to refrain from automatically fast scanning through commercial groups at the beginning and ending of a recording session. Such groups would nevertheless be marked in the manner previously described and could therefore be scanned through upon actuation of the SKIP button. To obtain the full benefit of this feature, it is preferable that each program which the user desires to record be made the subject of a separate recording session. Thus, even if two programs which the user desires to record are aired back to back, VCR timer commands should be separately entered for each program. Otherwise, lead-ins and lead-outs between the two programs may be automatically scanned through.

Over-Ride Operation

During the playback phase, the user may wish to stop the commercial skipping process. This can be accomplished in two ways. The user can disable commercial elimination entirely by selecting OFF with the MODE switch. This will cause the VCR to play the tape as would a conventional VCR. No further commercial elimination actions are taken until reenabled by the MODE switch.

Alternatively, the user can temporarily over-ride commercial elimination while the VCR is skipping a commercial group as shown at block 520 in FIG. 10. This may be conveniently accomplished by pressing Play on the remote control or front panel of the VCR. If the VCR is currently skipping a commercial group, the reception of the Play command will cause the VCR to immediately resume normal play mode and cancel blue screen and audio muting. This feature allows the user to temporarily stop the commercial elimination operation if the user wishes to view the commercial. This feature can also be used in the event that a commercial group is falsely detected during program material. Alternatively, the user can simply press the stop button to stop the VCR.

Over-ride operation does not change the current operating mode and does not disable commercial elimination functions except within the commercial group being skipped at the time of the over-ride. After an over-ride, the VCR will again skip the next commercial group if the automatic mode is selected. Commercial elimination can only be permanently disabled by setting the MODE switch to OFF.

Once a commercial group is over-ridden, device 10/10' will no longer attempt to skip that commercial group while in the automatic mode unless the tape is positioned at least three minutes ahead of the start of the group. This allows the user to back up and view a skipped video segment (which may have been falsely marked as commercial) without the playback phase attempting to skip that video segment again. This will occur when the tape is rewound to any position less than three minutes before the start of the group. However, for playback that occurs more than three minutes from the start of the over-ridden commercial group, device 10/10' will perform the normal commercial skipping process.

Commercial Detection Algorithm

The commercial detection algorithm detects the presence and location of commercial groups within a television program. The algorithm processes data obtained during a recording session in the form of an "event list". The event list is stored temporarily in RAM memory until it is processed, either during or at the end of the recording session. The list contains entries for each occurrence of an event. In the described embodiment designed for the North American television market, the detectors respond to "black" and silent video frames, and an event is declared if both conditions occur simultaneously.

By analyzing these events, and the timing relationships between them, the detection algorithm is able to determine the probable locations of commercial groups within the recorded session. The result of this analysis is a commercial group list, which indicates where the commercial groups start and end on the video tape.

Each event in the event list contains the value of the real-time tape counter at the beginning of the event. The detection algorithm determines the interval between events, measured in video frames. By applying a set of logical rules, the algorithm determines if the segment defined between two events is a commercial or a program segment. The algorithm takes each event and processes all subsequent events that occur within a time window established by the decision rules. For each of these subsequent events, the time differential dt is calculated and the following decision rules are implemented:

1. Is dt less than or equal to 34.99 seconds?
2. Is dt less than 49.99 seconds and greater than 43.0 seconds?
3. Is dt less than 64.99 seconds and greater than 58.0 seconds?

If there is an affirmative response to any one of the decision rules, the corresponding segment following the event being examined is considered to be a commercial. The foregoing decision rules have been optimized for maximizing the commercial detection rate and minimizing the program (i.e., false commercial detection) error rate for North American television broadcasting. Different decision rules may be required in other television markets. For example, as mentioned above, there are no black frames to identify commercials in Japanese television broadcasts. Here, the decision rules take advantage of the high degree of accuracy (within a few frames) in the length of commercial messages. In other markets, such as Europe, there is little consistency in broadcast standards so that a combination of rule sets is required.

It will be recognized that the above-stated decision rules may be supplemented with additional rules to enhance the accuracy of commercial detection. Efforts are ongoing to determine an optimum rule set. At the cost of greater complexity, the rules may be adaptively changed for the particular recording environment. For example, different rules may be invoked as functions of the time of day, broadcast channel, etc.

After analyzing the event list data, the algorithm has determined the suspected locations of individual commercials within the recorded session. The next step is to combine these individual commercials into groups of commercials. Commercial groups consist of two or more individual commercials—it is presumed that a single commercial will not be broadcast in isolation. By calculating the start and end times of each commercial group, the algorithm generates a commercial group list, which is also stored in RAM memory. A group is saved only if the total duration of the group is greater than 55.99 seconds.

Once the commercial group list is completed, or more frequently if on-the-fly processing is used, the event list can be erased from RAM memory since it is no longer needed.

As described above, the commercial group list is used during the marking phase to control the placement of the start and end commercial group tape marks. Upon completion of the marking phase, the commercial groups can also be erased from RAM memory since the video tape is now permanently marked with the locations of each commercial group.

Control Track Marking

The device of the present invention applies the commercial elimination "A" and "B" marks to the control (CTL) track of the video tape. The hardware required to support this marking feature already exists in most VCRs. The "A" and "B" marks modify the duty cycle of the synchronization signal written onto the control track at the time the program was recorded. Many VCRs currently implement a similar feature for placing index marks on the tape. The preferred technique utilized with the present invention for applying marks to the video tape is similar to the one described by Hori in U.S. Pat. No. 4,570,192.

Figure 11:
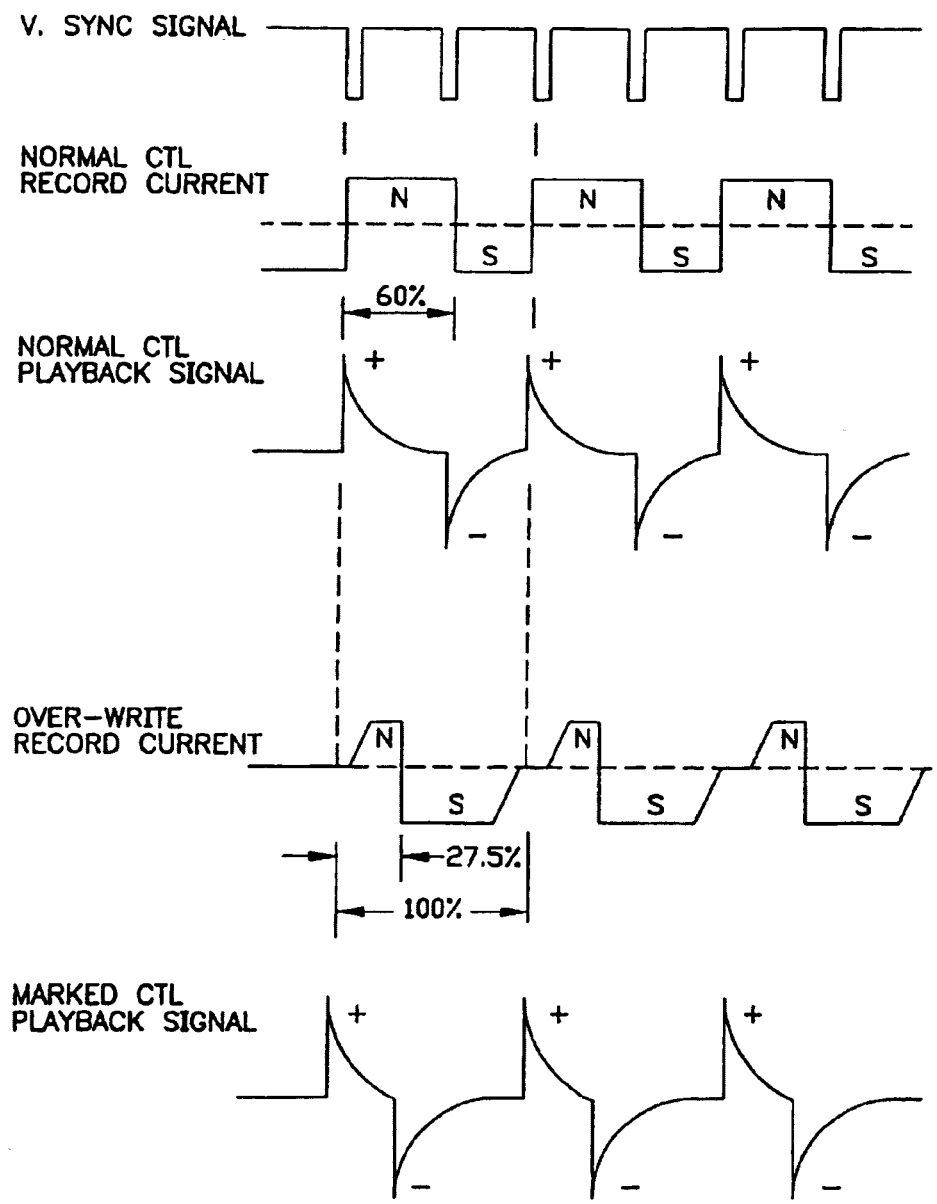
FIG. 11 illustrates over-writing the control track signal to place commercial elimination marks on the video tape.

Referring to FIG. 11, the video tape control track signal, as defined in the published standards for the VHS format, consists of a periodic signal in synchronization with the video frame timing. The signal is recorded with a rectangular wave format, and read back from the tape as a differentiated pulse train. The pulses indicate the rising and falling edges of the control track pulse signal. For video tape synchronization (tracking), the rising edge of the signal (positive playback pulse) is used to control the tape motor servos; the falling edge (negative playback pulse) is ignored. Therefore, as long as the rising edges of the control track signal are not disturbed, the duty cycle of the control track signal can be altered without affecting the operation of the video servo system.

When overwriting the control track with "A" and "B" marks, the VCR detects the control track signal and waits until just after the rising edge is detected before enabling control track record current. After the rising edge is detected, the write current is enabled and the timing of the duty cycle measured to control the polarity of the applied signal. The head write current is disabled before the actual end of the pulse in order to prevent overwriting the next rising edge of the control track pulse.

In order to improve compatibility with various VCR models, and to reduce noise associated with fast rise time signals, the leading edge of the overwrite wave form is preferably ramped. This improves readability when transferring a video tape between machines, that may have different head alignments or track widths.

Three types of marks are applied to the video tape: sync marks, A marks and B marks. These are designed to be compatible with VHS standard indexing marks. Each of the three types of marks is unique so that the VCR can readily distinguish between the beginning and ending of a commercial group. The marks comprise a sequence of video fields in which the control track signal is altered to have a duty cycle of either 27.5% or 60%.

Figure 12:
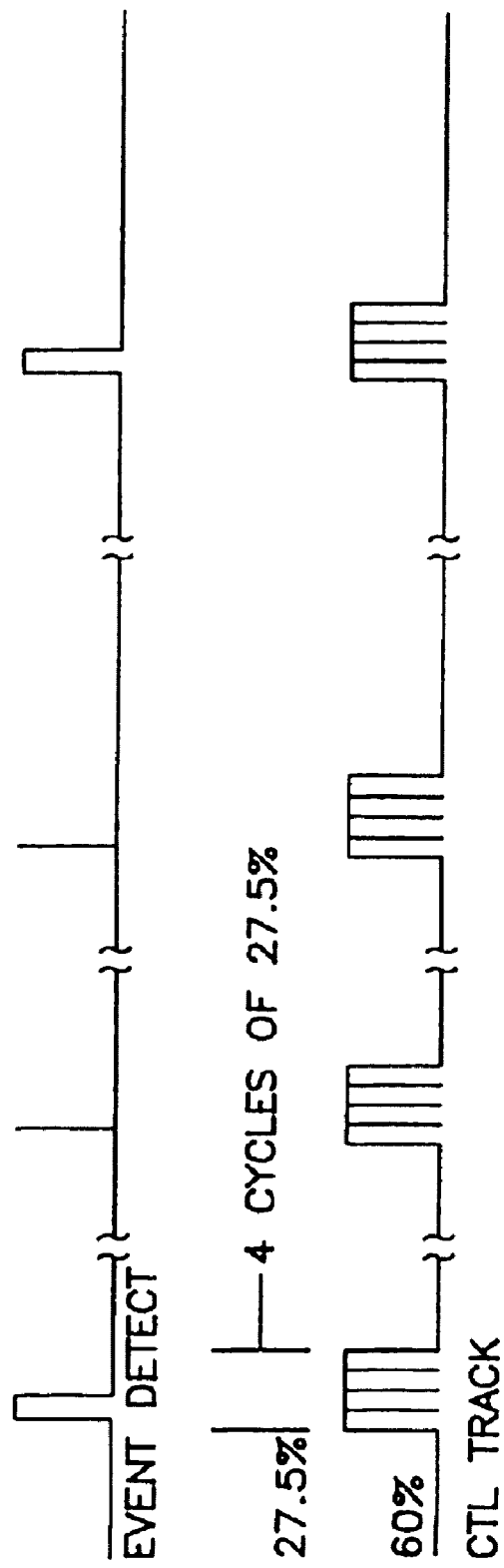
FIG. 12 illustrates the format of the sync mark.
Figure 13:
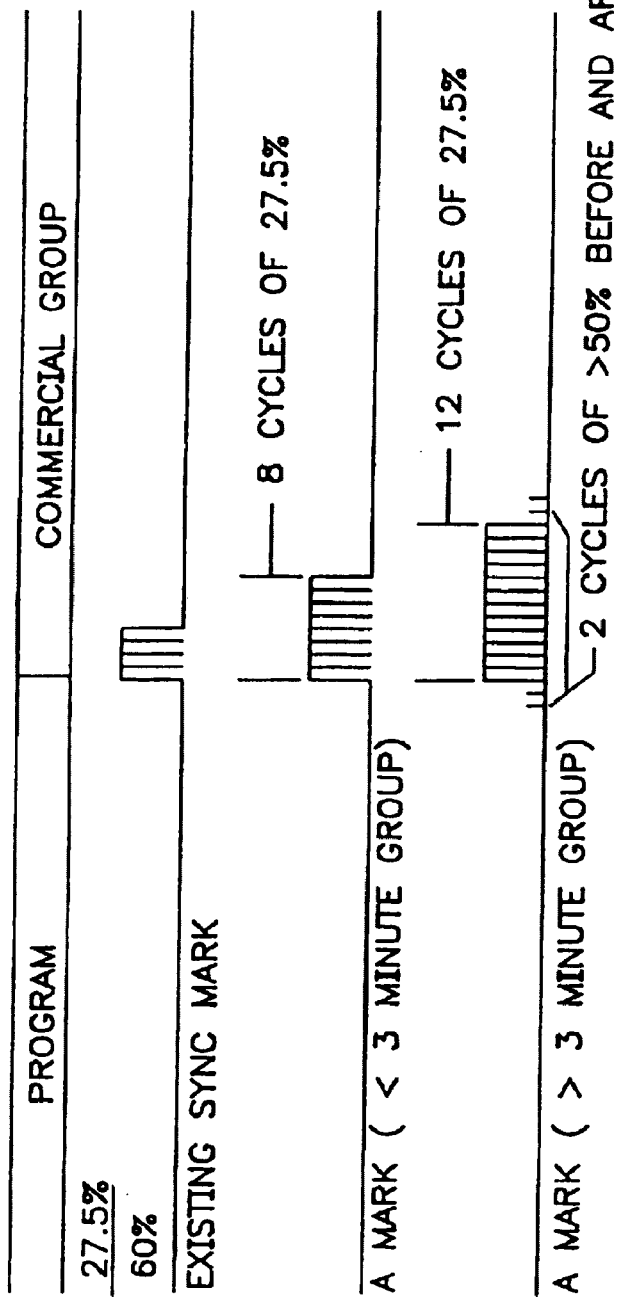
FIG. 13 illustrates the format of the "A" mark.
Figure 14:
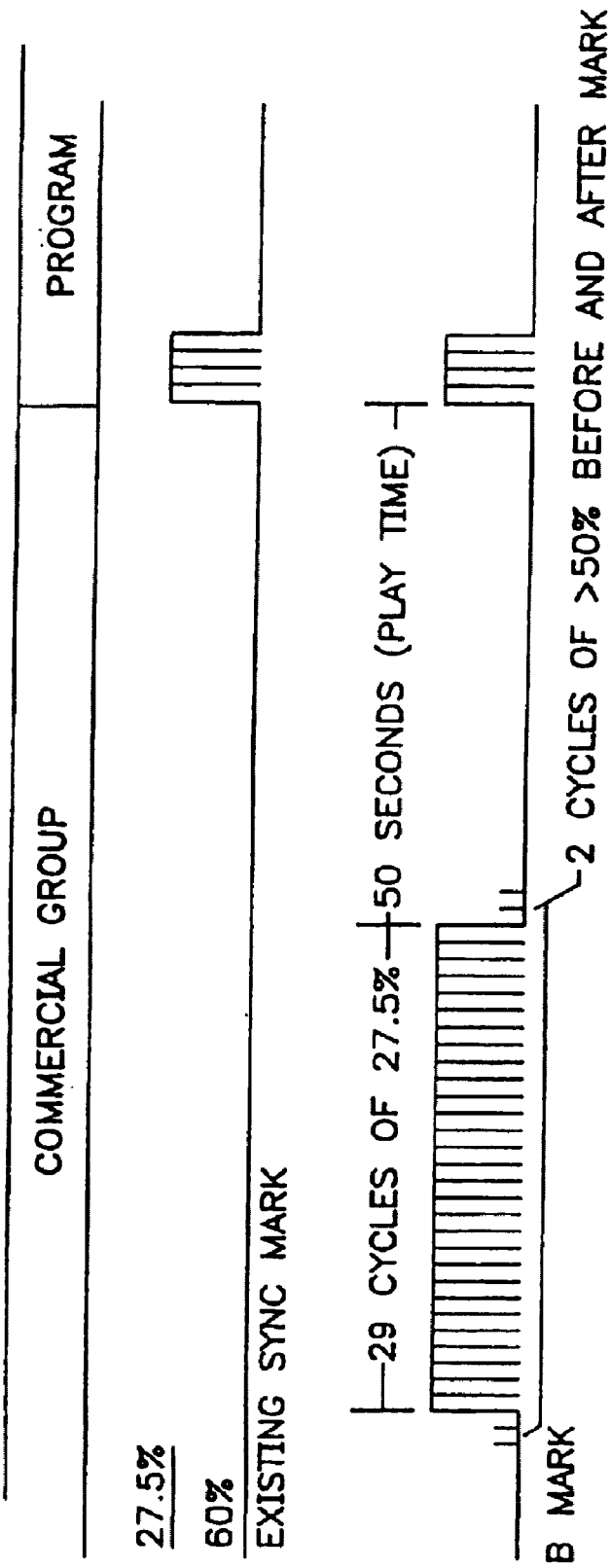
FIG. 14 illustrates the format of the "B" mark.

The formats of the control track marks are illustrated in FIGS. 12–14. FIG. 12 shows the sync mark, which is generated by device 10/10' during the recording phase of operation to mark the locations of detected events. For operation in North America where one or more black frames is a reliable indicator of a program transition, a sync mark is written upon simultaneous detection of a black frame event and a silent frame event. The sync mark consists of 4 cycles of the control track signal with a 27.5% duty cycle.

The time between the beginning of the detected event and the beginning of the sync mark preferable does not exceed 500 msec.

The A mark, which denotes the beginning of a commercial group, is shown in FIG. 13. This mark is written over a corresponding sync mark that was generated during the recording phase. During the marking phase, when the sync mark associated with the calculated start of a commercial group is detected, the control track is overwritten with the A mark. At the same time, the VCR tape counter is corrected for any error. If a sync mark is not detected within ±2 seconds of its expected position, the A mark is nevertheless written, but the VCR tape counter is not updated.

The length of the A mark is preferably related to the length of the commercial group that follows. This allows the option, in the playback phase, of placing the VCR in its off-head fast forward mode to scan past a long commercial group. In most VCR transports, the off-head fast forward speed is significantly faster than the on-head forward scan speed. In an exemplary embodiment, the A mark has 8 cycles at a 27.5% duty cycle if the commercial group has a playing time of three minutes or less and has 12 cycles at 27.5% duty if the commercial group is longer than three minutes. Of course, these numbers are somewhat arbitrary and other values can be used if desired. The decision of whether or not to go off-head depends on the characteristics of the tape transport mechanism and involves a trade-off between the time required to unload the head and the time saved by moving the tape at the higher fast forward speed. With some transport mechanisms, it may be more efficient to always remain on-head.

FIG. 14 illustrates the format of the B mark, which is written near the end of each commercial group. This mark is written substantially before the sync pulse corresponding to the actual end of the commercial group so that the tape transport will have sufficient time to return to the normal play speed at the end of a commercial skipping operation and reestablish tracking, if necessary. The B mark preferably consists of 24 cycles at 27.5% duty cycle and ends at a fixed period of time before the ending point of the commercial group. In an exemplary embodiment, the B mark ends 50 seconds of playtime before the sync mark to accommodate a relatively high fast scan speed. It is preferred that the formats of the tape markings be consistent in all devices built according to the invention so that video tapes marked on any one such device can be replayed on another with identical commercial elimination functionality.

It is possible that A and B marks may be written over previously written sync marks. To insure that the marks do not appear to be extended as a result of such overwriting, each of the marks preferably includes at least two cycles of 60% duty factor at the leading and trailing edges of the mark so that the mark is clearly delineated.

In accordance with VHS standards, indexing marks may also be encoded on the control track using a variable duty cycle. Index marks are typically recorded on the video tape at the start of a recording, or they can be manually written or erased in some VCR models. The VHS index mark consists of a solid pattern, e.g., 61–64 cycles, of 27.5% duty cycle pulses. In order to insure reliable detection of an index mark without interference by commercial elimination marks, the VCR control software should require at least 25 successive control track cycles at the 27.5% duty cycle for identification of an index mark. Requiring 25 cycles for index mark detection allows the VCR to differentiate between the commercial elimination marks (which are all shorter than 25 cycles) and index marks.

Each time a new recording is made, an index mark should be recorded at the start of the recording session. This will ensure that the recorded program will not be skipped over as a result of an A mark recorded earlier on the tape. This can occur if a user partially rewinds a tape and starts a new recording that erases a previously recorded B mark. If the tape is subsequently rewound to a position preceding the last A mark of the old recording, there is no B mark to cause the VCR to return to the play mode. However, since an index mark can also be detected as a B mark, recording the index mark will ensure that the new recording is not skipped.

The following table indicates the number of sequential cycles required for reading and writing commercial elimination marks and index marks:

| Type of Mark | Write | Read |
| --- | --- | --- |
| Sync mark | 4 cycles | 2 to 4 cycles |
| A Mark (short commercial group) | 8 cycles | 7 or 8 cycles |
| A mark (long commercial group) | 12 cycles | 11 or 12 cycles |
| B mark | 24 cycles | ≧16 cycles |
| Index mark | ≧61 cycles | ≧25 cycles |

When reading 1, 5, 6, 9 or 10 cycles, no valid mark is detected.

The marking operation, briefly described above in connection with FIG. 10, is accomplished with the following steps:

1. Rewind to a position before the start of the first commercial group in the recording session.

2(a). Play until 2 seconds prior to start of the commercial group.

2(b). Detect sync mark (or time-out after 2 seconds if sync mark not found).

2(c). Correct for error in real-time tape counter.

2(d). Overwrite control track with "A" mark.

2(e). Begin fast forward or scan toward the end of the group.

2(f). Enter play mode 55 seconds (or as far in advance as required) prior to the end of the group.

2(g). Overwrite control track with "B" mark.

2(h). Advance to the start of next commercial group.

3. Repeat 2(a)–(h) above for all commercial groups.

4. Fast forward to end of recording session and stop.

Movie Cueing

In pre-recorded videos of motion pictures, it is common practice to include a number of "trailers", commercials and other advertising messages before the feature. These can have an aggregate playtime of 10 minutes or more, which is often an unwelcome distraction to the viewer. A VCR constructed in accordance with the present invention can be readily adapted to cue a pre-recorded motion picture to the beginning of the feature presentation.

Figure 15:
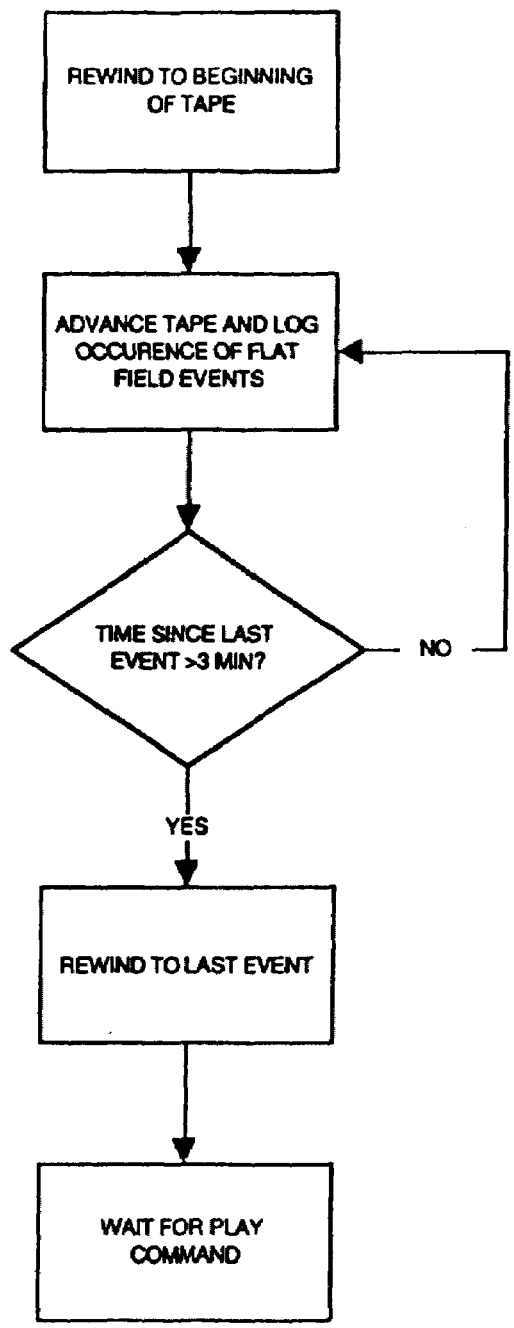
FIG. 15 is a functional flow diagram of the movie cueing feature of the present invention.

FIG. 15 is a flow diagram of the software routine that implements the movie cueing feature of the present invention. This routine is preferably implemented in processor 114' of apparatus 10', although it could also be implemented in a stand alone device. In this description, it is presumed that the motion picture is recorded on a video cassette. However, it will be understood that the invention is not limited in this regard and the movie cueing feature may be implemented to operate with any recording medium. When a pre-recorded movie is placed in device 10', the tape is first rewound to the beginning. This may be accomplished by actuating a "MOVIE" control on the front panel of the device or on a remote control transmitter. Alternatively, the device may automatically sense that a pre-recorded movie has been inserted. This may be accomplished by examining the video signal. In this regard, most pre-recorded movies have a copy protection feature, wherein a pattern of white bars is cyclically modulated in a portion of the vertical blanking interval. The presence of such copy protection is easily detected with the video event detection circuitry of apparatus 10'. Other video characteristics of pre-recorded movies include the absence of commercial elimination markings and recording at standard play (SP) speed. These characteristics can be used to exclude recordings that are clearly not pre-recorded movies.

Once the tape has been rewound, it is advanced while the video signal is monitored for flat frame events. As in broadcast television, the trailers and commercials on a pre-recorded movie are typically separated by blank frames. As flat frames are detected, the value of the real time tape counter is stored. If the tape has advanced for more than 3 minutes of playing time without detection of a flat frame event, it is presumed that the feature presentation has been located. The tape is then rewound to the location of the last detected event, and the VCR is stopped or paused. This may be accompanied by an on-screen display that prompts the viewer to press PLAY in order to begin the movie.

While flat frame events are being logged, the tape is preferably being advanced at a fast scan speed, provided that the video noise bars characteristic of fast scanning do not interfere with detection of flat frame events. Filtering of the video detector output may be required to eliminate the effects of such noise bars. Alternatively, the detector may have a direct hardware interface to the servo electronics and head switching signals to provide a gating signal. This gating signal will allow the detector to ignore video within the noise bars. The audio detector should receive the audio signal even in fast scanning mode so that detected video events can be matched with audio silence.

Information Decoding

It will be recognized that the video event detection capability of device 10/10' has the inherent capability for decoding information modulated on the video signal. Individual video frames can be modulated as black or non-black to provide a simple binary coding scheme. Although this affords a relatively low data rate, it can be an effective way to transmit data to device 10/10' if only black frame detection is provided. One application for such data communication is the transmission of time-of-day information so that the built-in clock of device 10/10' will always have the correct time. Inexpensive television broadcast time is often available in early morning hours. Such time can be advantageously utilized to transmit information to all receiving devices. The devices can be preprogrammed to scan for information at certain times of the day when normal use of the device is unlikely. Thus, for example, the device may enter a scan mode at 3 a.m. to search for a data header encoded with black frames. When the header is located, the data which follows is decoded and stored in processor 114. Aside from time-of-day, the coded information may include, for example, new operating instructions for processor 114. In this way, the commercial elimination algorithm can be periodically and automatically updated.

It should be apparent that the data communication bandwidth can be substantially higher in device 10' since up to each video line can be sampled. If all video lines are utilized to encode individual data bits, the communication bandwidth increases to 15.7 kHz.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of cueing a recorded video program to a desired segment comprising:

detecting events in the video program, each of said events being at least one of a flat frame, a silent frame and a cut;

storing data representative of a time of occurrence of each event;

analyzing temporal spacing of the events to classify segments of the video program between events as belonging to one of a first and second category;

cueing the video program to an event located at a beginning of a next segment classified as belonging to the second category.

2. An apparatus for automatically cueing a recorded video program to a desired segment comprising:

means for detecting events in the video program, each of said events being at least one of a flat frame, a silent frame and a cut;

means for storing data representative of a time of occurrence of each event;

means for analyzing temporal spacing of the events to classify segments of the video program between events as belonging to one of a first and second category;

means for cueing the video program to an event located at a beginning of a next segment classified as belonging to the second category.

* * * * *

UNITED STATES PATENT AND TRADEMARK OFFICE
CERTIFICATE OF CORRECTION

| | | |
|---|---|---|
| PATENT NO. | : 7,110,658 B1 | Page 1 of 1 |
| APPLICATION NO. | : 09/384468 | |
| DATED | : September 19, 2006 | |
| INVENTOR(S) | : Iggulden et al. | |

It is certified that error appears in the above-identified patent and that said Letters Patent is hereby corrected as shown below:

On Title Page in Item [63], Related U.S. Application Data, Line #3, before "application" please insert -- co-pending --.

On Title Page in Item [63], Related U.S. Application Data, Line #5, before "application" please insert -- co-pending --.

On Title Page in Item [63], Related U.S. Application Data, please delete line #'s 7-10, "08/103,067...Pat. No. 5,333,091" and insert -- 08/002,782 filed January 8, 1993, now U.S. Patent No. 5,333,091, and of application Serial No. 08/103,067 filed August 6, 1993 now U.S. Patent No. 5,455,630 --.

Signed and Sealed this

Sixteenth Day of October, 2007

JON W. DUDAS
*Director of the United States Patent and Trademark Office*